United States Patent [19]

Dirmeyer et al.

[11] Patent Number: 4,581,596

[45] Date of Patent: Apr. 8, 1986

[54] INTERFERENCE SUPPRESSION FILTER

[75] Inventors: Josef Dirmeyer, Regendorf; Karl Holzmann, Zeitlarn; August Käser, deceased, late of Munich, by Monika I. Käser, heir; Hans Kornstädt, Regensburg; Josef Kraus, Regensburg; Joachim Müller, Regensburg; Ernst Schmidt, Beratzhausen, all of Fed. Rep. of Germany

[73] Assignee: Siemens Aktiengesellschaft, Berlin and Munich, Fed. Rep. of Germany

[21] Appl. No.: 346,878

[22] Filed: Feb. 8, 1982

[30] Foreign Application Priority Data

Feb. 20, 1981 [DE] Fed. Rep. of Germany ....... 3106424

[51] Int. Cl.$^4$ ............................................. H03H 7/01
[52] U.S. Cl. ................................. 333/181; 174/52 R; 333/185
[58] Field of Search ............... 333/185, 184, 183, 181; 339/275 R, 275 B, 275 A, 276 R, 276 A, 277 R; 361/399, 400, 404, 406; 174/52 R, 50.54

[56] References Cited

U.S. PATENT DOCUMENTS 2,869,040  1/1959  Pifer ................................. 361/406 X
3,251,015  5/1966  Denham ........................... 333/185 X

FOREIGN PATENT DOCUMENTS 2520799  11/1976  Fed. Rep. of Germany ... 339/275 R

Primary Examiner—Paul L. Gensler
Assistant Examiner—Benny Lee
Attorney, Agent, or Firm—Herbert L. Lerner; Laurence A. Greenberg

[57] ABSTRACT

Interference suppression filter, including a metal cup having an open end, a ring core choke, a wound capacitor and a discharge resistor being interconnected and cast together in the metal cup, first and second network side and appliance side connectors being extended outwardly through the open end of the cup, the first connectors each being connected to the ring core choke and having free ends, an insulator plate disposed adjacent the open end of the cup, and resilient clamping elements being disposed on the plate, at least the free ends of the first connectors being held by the clamping elements, and the second connectors being dip-soldered to the first connectors.

21 Claims, 11 Drawing Figures

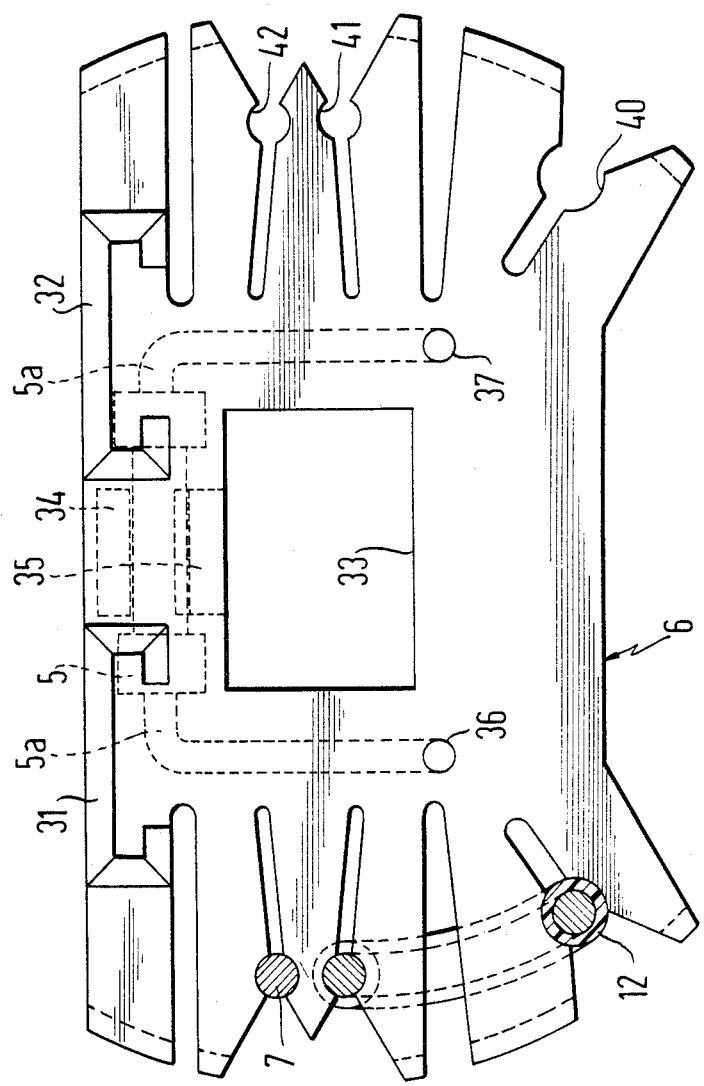

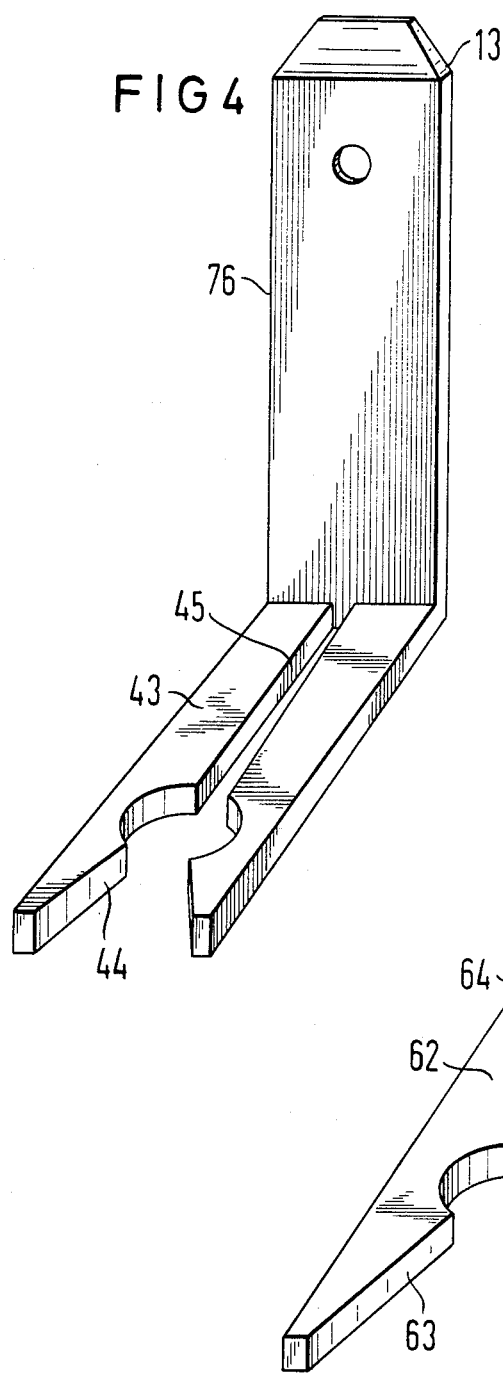
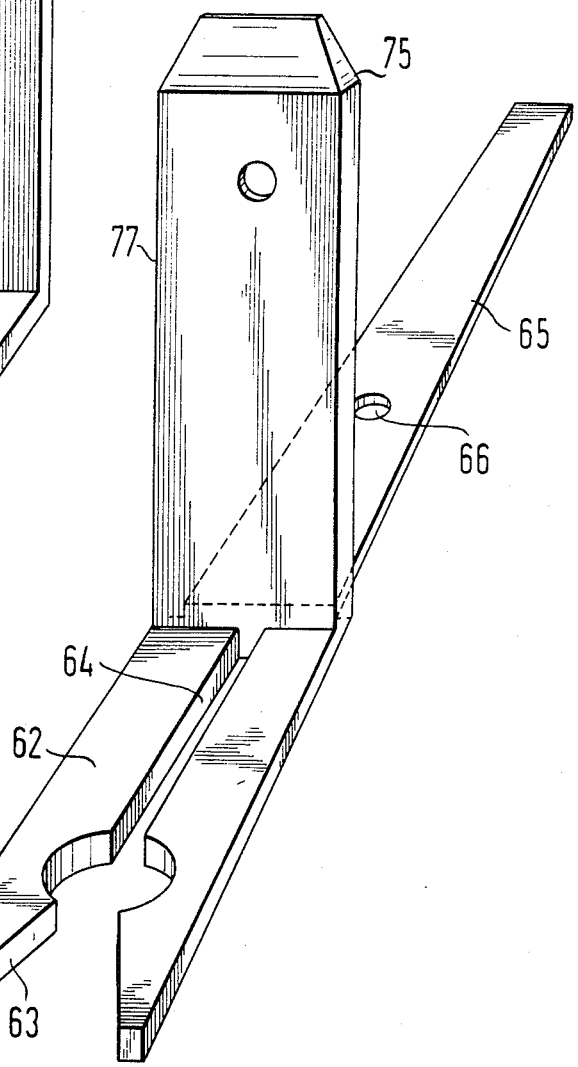

INTERFERENCE SUPPRESSION FILTER

The invention relates to an interference suppression filter having a ring core choke, a wound capacitor, especially a paper capacitor, and a discharge resistor, which are inserted in a metal cup and interconnected and cast in the interior thereof, and line or network side and appliance side connections fed outward through an open face of the metal cup.

With a known interference suppression filter of this type sold by the Siemens Corporation under the type designation B81931-A-F3, the ring core choke and the wound capacitor disposed thereon are inserted in a metal cup having bottom and inner wall insulation. Pressed onto the edge faces of the open cup end is a mounting for flat plugs, which is equipped with packing washer-type beads and has additional guide elements for line connection strands. With this known construction, the ring core choke connections, which are pressed against the outer jacket of the wound capacitor by means of insulator taping, have their free ends soldered to the flat plugs or strand ends that are bared of insulation, respectively. Additionally, the discharge resistor connection ends and the capacitor connections are bonded, i.e., soldered with the ring core choke connections being fed to the flat plugs. The entire soldering process must be carried out by hand. Aside from this, because of the required cup insulation, the taping of the ring core choke connections and the required pressing-on of the mounting device onto the free cup face edges, a considerable and even indefensible expenditure from a production engineering point of view is required.

It is accordingly an object of the invention to provide an interference suppression filter which overcomes the hereinafore-mentioned disadvantages of the heretofore-known devices of this general type, and which, based on its special construction, can be manufactured with a minimal engineering expenditure, and simultaneously meets the mechanical and electrical standard requirements for filters such as these, in a troublefree way.

With the foregoing and other objects in view there is provided, in accordance with the invention, an interference suppression filter, comprising a metal cup having an open end, a ring core choke, a wound capacitor and a discharge resistor being interconnected and cast together in the metal cup, and wherein the choke has first and second network side and first and second appliance side connections with free ends being extended outward through the open end of the cup, an insulator plate disposed adjacent the open end of the cup, and having resilient clamping elements disposed on the plate, and wherein at least the four free ends of the first network and appliance side connection of aforesaid choke are being held by the clamping elements, and which are directly or indirectly dip-soldered to network and appliance side connectors.

In accordance with another feature of the invention, the clamping elements are integral with the plate.

In accordance with a further feature of the invention, there are provided supports connecting the clamping elements to the plate.

In accordance with an added feature of the invention, there are provided supports for the clamping elements, the clamping elements being partly integral with the plate and being partly connected to the plate by the supports.

In accordance with an additional feature of the invention, there are provided metallic angle plates connected to the insulator plate, each of the angle plates having one leg in the form of a flat plug and another leg in the form of a resilient clamping element.

In accordance with again another feature of the invention, the metallic angle plates have an additional leg being in alignment with the leg forming the resilient clamping element, the additional leg having a slotted perforation formed therein for feeding connection ends of the discharge resistor therethrough.

In accordance with again a further feature of the invention, the insulator plate has one side facing the open end of the cup and another side facing away from the open end of the cup, and the discharge resistor has connection ends, and including a catch-type support integrally formed on the other side of the plate for holding the discharge resistor, and the plate having holes formed therein through which the connection ends of the discharge resistor are feedable to the one aforesaid side of the plate.

In accordance with again an added feature of the invention, the wound capacitor includes a front and a rear end face and connection ends, at said front end face and the plate has a preferably central perforation formed therein for feeding through the capacitor connection ends.

In accordance with again an additional feature of the invention, there is provided a plugging device formed on a face of the plate for plugging the plate onto the front end face of the wound capacitor.

In accordance with yet another feature of the invention, the wound capacitor has an outer jacket, and the plugging device includes two plugs and a fork-shaped resilient press-on device corresponding with the plugs for pressing the outer jacket of the wound capacitor against the plugs.

In accordance with yet a further feature of the invention, the capacitor has front end face, and the plate has a surface facing toward the front end face, and including a plurality of stop-like, bolt-shaped range spacers disposed on the surface of the plate facing the end face of the capacitor for placing the plate against the end face of the capacitor with a given defined spacing therebetween.

In accordance with yet an added feature of the invention, the discharge resistor and wound capacitor connection ends are respectively fed through the holes and perforation formed in the insulator plate and are directly or indirectly dip-soldered to the first appliance side connectors of the ring core choke.

In accordance with yet an additional feature of the invention, the connection ends of the resistor and capacitor are electrically conductively dip-soldered to the legs of the angle plate forming the resilient clamping elements.

In accordance with still a further feature of the invention, the insulator plate has holes and perforations formed therein for respectively feeding connection ends of the discharge resistor and wound capacitor therethrough, the connection ends being dip-soldered to the first appliance side connectors of the ring core choke and being electrically conductively dip-soldered to the additional legs of the metallic angle plate.

In accordance with still another feature of the invention, the discharge resistor and wound capacitor have connection ends being directly electrically conductively dip-soldered to the first appliance side connectors of the ring core choke. Therefore, according to the connector type, i.e., if only studs, or flat plugs or combinations thereof are required for appliance side and line or network side connections, all of the clamping elements can be integrally connected with the insulator plate, all of the clamping elements can be mounted on the insulator plate by additional mountings, or combinations of both types can be provided.

Because of this specific type of plate construction, all soldering connections, eight being used in the illustrated embodiment, can be produced in one operating step by dip-soldering. Further omitted is a press-on of a mounting device onto the metal cup edge face. All that remains to be done following the dip-soldering operation, and this being done without any apparatus at all, is the insertion of the insulator plate into the cup interior, in interconnection with the ring core choke, the wound capacitor, and the discharge resistor.

In accordance with another feature of the invention, the ring core choke has windings and an opening formed therein, and including an insulating barrier being inserted in the ring core opening for spatially separating the windings from each other.

In accordance with a further feature of the invention, there is provided a synthetic centering platelet on which the insulating barrier is vertically and centrally disposed, the outer diameter of the platelet being substantially equal to the inner diameter of the metal cup.

In accordance with an added feature of the invention, the cup has a bottom having a centering pin centrally disposed thereon, and the insulating barrier has a face facing the cup bottom having a conical centering depression being centrally formed therein and seated on the centering pin.

In accordance with an additional feature of the invention, the cup has a bottom having a centering depression centrally formed therein, and the insulating barrier has a face facing the cup bottom having a centrally disposed centering pin disposed thereon, the centering pin being tapered toward the cup bottom and being in engagement with the centering depression.

In accordance with a concomitant feature of the invention, the wound capacitor has a central hole formed therein, and the insulating barrier has a face facing the wound capacitor having a centering point being centrally formed thereon and being immersible in the centering hole formed in the capacitor, in an assembled condition of the filter.

The windings of the ring core choke, as is well known, are spatially separated by an insulating barrier or web slid into the ring core opening.

The proposal according to the invention for a further improved embodiment of an interference suppression filter of the above-mentioned type, provides that these insulating barriers are additionally constructed as centering elements, which assures a centered alignment of the ring core choke and wound capacitor in the cup interior. In this way, the use of insulating foils for insualting the inner wall and bottom of the cup, can be dispensed with.

Other features which are considered as characteristic for the invention are set forth in the appended claims.

Although the invention is illustrated and described herein as embodied in interference suppression filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is an enlarged top-plan view of the insulator plate according to FIGS. 1 and 2, in which the discharging resistor is indicated by broken lines;

FIG. 4 is an enlarged perspective view of the metallic angle plate according to FIGS. 1 and 2;

FIG. 7 is a view similar to FIG. 4, of a second embodiment of a metallic angle plate;

Figure 1:
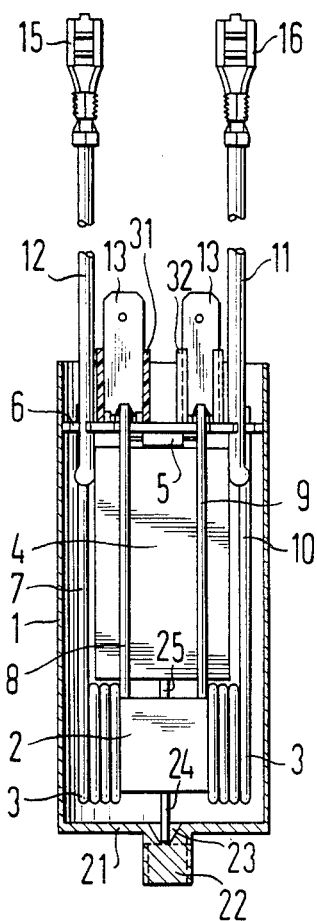
FIG. 1 is a fragmentary, diagrammatic, partially cross-sectional side view of a first embodiment of an interference suppression filter according to the invention.
Figure 2:
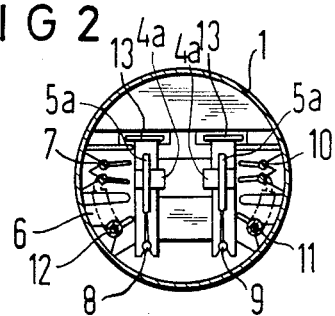
FIG. 2 is a top-plan view of the interference suppression filter according to FIG. 1, in which certain parts have been omitted for a better illustration.

Referring now to the figures of the drawing and first particularly to the interference suppression filter according to FIGS. 1-3 thereof, it is seen that the filter has a metal cup 1 having a screw bolt 22 formed or tip-stretched onto the bottom 21 of the cup. Disposed inside the cup 1 is a ring or toroidal core choke or coil 2 having windings 3,3, on which a roll type or paper capacitor or condenser 4 is disposed. Adjacent the open front end of the cup 1, there is disposed a plate 6 made of insulator material. This insulator plate has clamping or binding post elements 40, 41, 42 (FIG. 3) integrally formed thereon. Additionally, the insulator plate has supports in the form of holders or mountings 31, 32 (FIGS. 1 and 3) aligned perpendicularly thereto, in which metallic angle plates or elbows 76, as shown in FIG. 4, are retained. Network side ring core choke connections 7, 10 are shown, and have free ends that are gripped by the clamping elements 42 (see FIG. 3). Equipped with plug contacts 15, 16, first and second stranded or cable-like network side interference suppression filter connections 11, 12 (FIGS. 1 and 2) are clamped at the elements 40 (FIG. 3) and have also their free ends that are stripped or bared of insulation, being extended and gripped by the clamping elements 41. The connection ends adjoining each other in the clamping elements 41, 42, are electrically conductively interconnected by mechanical bonding and subsequent dip-soldering, in a non-illustrated manner.

The metallic angle plates 76 (FIG. 4) have a set of legs constructed as flat plugs 13 for appliance side connectors, and a set of legs 43 having spring-loaded clamping elements 44 and slots 45. Free ends of appliance-side ring core choke connections 8, 9 shown in the drawing, FIG. 2 are clamped by elements 44, and are electrically bonded therewith by dip-soldering.

The insulation plate 6 has a centrally disposed cut 33 and holes 36, 37 formed therein. On its end face turned away from the open end face of the cup 1, the plate 6 carries an integrally formed on spring loaded catch-like mounting 34, 35 for a discharging resistor 5. The connection ends 5a of the resistor 5 are fed through the slots 45 of the angle plates 76 and are connected to the legs 43 thereof. Tape-like connection ends 4a of the paper capacitor 4 are fed through to the centrally disposed cut 33 and are also connected to the legs 43. In a single dip-soldering operation, the capacitor connections 4a and the connection ends 5a of the discharging resistor 5, are electrically bonded with the legs 43, and the ring core choke connections 7, 8, 9 and 10 are electrically bonded with the stranded ends of the first and second network connections and with the clamping elements 44, respectively.

The windings 3,3 of the ring core choke 2 are spatially separated by an insulating web or barrier 25 slid into the ring core center opening. On its side facing the metal cup bottom 21, the barrier 25 has a centrally disposed centering pin 24, which is conically tapered toward the cup bottom and engages a centering hollow or depression 23 disposed in the metal cup bottom 21. A non-illustrated centrally disposed centering point is formed on that edge face of the barrier 25 that is facing the wound capacitor 4, the point plugging into a central hole that is also not shown, of the paper capacitor 4.

Through the use of this centering device, the otherwise required use of cup bottom and inner wall insulation is unnecessary. The unused inside spaces of the cup 1 (not shown for purposes of clarity of illustration) are filled with a synthetic resin, especially a self-curing casting resin.

Figure 5:
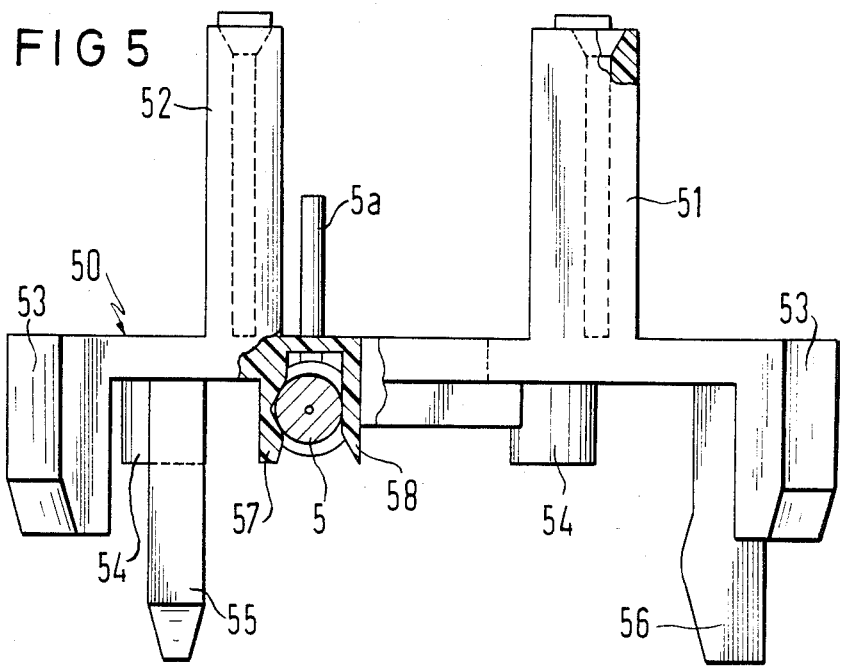
FIG. 5 is an enlarged cross-sectional side view, partly broken away, of a second embodiment of an insulator plate according to the invention.
Figure 8:
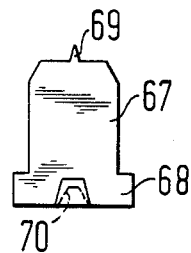
FIGS. 8 and 9 are respective side-elevational and fragmentary cross-sectional views of an embodiment of a centering device for ring core chokes and wound or paper capacitors.
Figure 6:
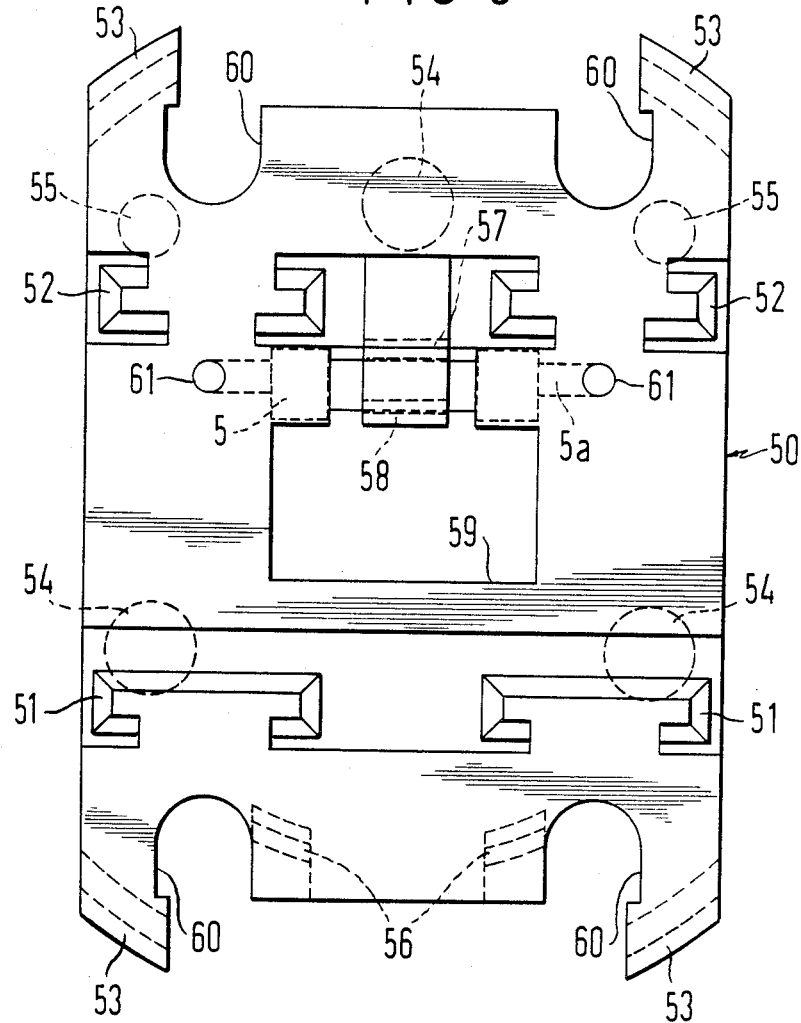
FIG. 6 is a top-plan view of the interference suppression filter according to FIG. 5, in which parts that are only visible from underneath are indicated by broken lines.

An insulation plate 50 according to FIGS. 5 and 6 showing a second embodiment of the invention has two shaft-like mountings 51, which are suitable for accomodating the angle plate 76 (see FIG. 4), and two mountings 52 which are also shaft-like, for mounting a metallic angle plate 77 according to FIG. 7. The angle plates 77 have an additional leg 65, which is aligned with a leg 62, constructed as a spring-loaded clamping element 63. The legs 62, 65 are equipped with slots 65 and perforations 66, respectively. The angle plates 76, 77 have legs in the form of flat plugs 13 and 75, respectively. The slots or perforations 45, 64, 66 serve in conjunction with holes 61 in the insulation plate 50, to bond the connector ends 5a of the discharging resistor 5 with the respective legs of the angle plates 76, 77. The discharging resistor 5 is therefore held in a catch-type mounting 57, 58.

Approximately at the center of the insulation plate 50, a perforation or cut 59 is provided. Through this perforation, the tape-like connections of the paper capacitor are fed to the legs 65 of the angle plates 77.

In the mounted position, the spring-loaded clamping elements 44, 63 are disposed over open-edge recesses 60 (FIG. 6), through which the ring core choke connections 7, 8, 9 and 10 are fed to the clamping elements. This aligns the holes 61 in the insulation plate 50 with the perforations 66 of the legs 65.

With this embodiment too, the dip-soldering of capacitor connections and connection ends of the discharging resistor with respective legs of the angle plates, and the dip-soldering of ring core choke connections 7, 8, 9 and 10 with the clamping elements 44, 63, respectively, also follows in a single operating step.

On its side opposite from that of the mountings 51, 52, the insulation plate 50 carries a plugging device including two pins or plugs 55, and corresponding therewith a fork-type, spring-loaded, press-on device 56, under the effect of which the paper capacitor has its respective outer jacket surface pressed against these pins or plugs 55.

On its side facing the capacitor, the insulation plate 50 has a plurality of stop-like, bolt-shaped range spacers 54. With the insulation plate 50 being set upon the capacitor, these holders are disposed against the capacitor facing them, and in that way they assure a space therebetween for the discharging resistor 5. Additionally, there are centering pins 53 integrally formed onto four corners of the insulation plate 50 for respectively providing a safely centered insertion and disposition of the plate when being placed into, or after being disposed in, the metal cup.

FIGS. 8 through 11 show further embodiments of centering devices. Thus, the centering device according to FIGS. 8 and 9 has an insulating web or barrier 67 having, on its end 68 facing the bottom 72 of a metal cup 71, a centrally disposed, frustoconical centering depression 70, which is open toward the metal cup bottom and can be seated on a centering pin 74 being centrally disposed in the metal cup bottom 72. The cup bottom 72 also has a screw bolt 73 disposed thereon and the web 67 includes a centering point 69.

Figure 10:
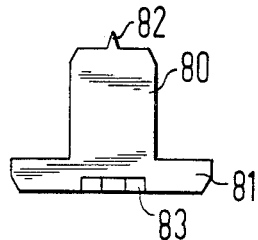
FIGS. 10 and 11 are respective side elevational and top-plan views of a second embodiment of a centering device.
Figure 9:
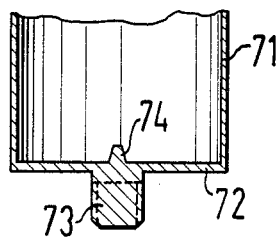
Figure 11:
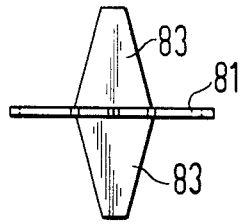

The centering device according to FIGS. 10 and 11 has an insulating barrier or web 80, which is vertically and centrally disposed upon a centering platelet 83 formed of a synthetic or a plastic material. The outer diameter of the centering platelet 83 and the diameter of a part 81 of the insulating web 80 are about equal to the inner diameter of the metal cup. A centering point 82 is also formed on the barrier 80.

We claim:

1. Interference suppression filter, comprising a metal cup having an open end, and a bottom, a ring core choke, a wound capacitor and a discharge resistor being interconnected and cast together in said metal cup, said choke having first and second network side and first and second appliance side choke connections, said connections extended outwardly through said open end of said cup, first and second network side and first and second appliance side connectors, said connections each being connected to said ring core choke and having outwardly extending free ends, an insulator plate disposed adjacent said open end of said cup, and resilient clamping elements being disposed on said plate, at least said free ends of said connections being held by said clamping elements, and said first and second connectors being dip-soldered to said first and second choke connections.

2. Interference suppression filter according to claim 1, wherein said clamping elements are integral with said plate.

3. Interference suppression filter according to claim 1, further comprising supports connecting said clamping elements to said plate.

4. Interference suppression filter according to claim 1, further comprising supports for said clamping elements, said clamping elements being partly integral with said plate and being partly connected to said plate by said supports.

5. Interference suppression filter according to claim 1, including metallic angle plates connected to said insulator plate, each of said angle plates having one leg in the form of a flat plug and another leg in the form of a resilient clamping element.

6. Interference suppression filter according to claim 5, wherein said metallic plates have an additional leg being in alignment with said leg forming said resilient clamping element, said additional leg having a slotted perforation formed therein for feeding connection ends of said discharge resistor therethrough.

7. Interference suppression filter according to claim 1, wherein said insulator plate has one side facing said open end of said cup and another side facing away from said open end of said cup, and said discharge resistor has connection ends, and including a catch-type support integrally formed on said other side of said plate for holding said discharge resistor, and said plate having holes formed therein through which said connection ends of said discharge resistor are feedable to said one side of said plate.

8. Interference suppression filter according to claim 1, wherein said wound capacitor includes connections, and said plate has a perforation formed therein for feeding through said capacitor connections.

9. Interference suppression filter according to claim 1, including a plugging device formed on a face of said plate for plugging said plate onto a face of said wound capacitor.

10. Interference suppression filter according to claim 9, wherein said wound capacitor has an outer jacket, and said plugging device includes two plugs and a fork-shaped resilient press-on device corresponding with said plugs for pressing said outer jacket of said wound capacitor against said plugs.

11. Interference suppression filter according to claim 1, 9 or 10, wherein said capacitor has a front end face, and said plate has a surface facing toward said end face, and including a plurality of stop-like, bolt-shaped spacers disposed on said surface of said plate facing said front end face of said capacitor for placing said plate against said front end face of said capacitor with a given defined spacing therebetween.

12. Interference suppression filter according to claim 6, wherein said insulator plate has one side facing said open end of said cup and another side facing away from said open end of said cup, and including a catch-type support integrally formed on said other side of said plate for holding said discharge resistor, and said plate having holes formed therein through which said connection ends of said discharge resistor are feedable to said one side of said plate, said wound capacitor including connection ends, and said plate having a perforation formed therein for feeding through said capacitor connection ends, and said discharge resistor and wound capacitor connection ends respectively being fed through said holes and perforations formed in said insulator plate and being dip-soldered to said first and second appliance side connections of said ring core choke.

13. Interference suppression filter according to claim 12, wherein said connection ends of said resistor and capacitor are electrically conductively dip-soldered to said legs of said angle plates forming said resilient clamping elements.

14. Interference suppression filter according to claim 6, wherein said insulator plate has holes and perforations formed therein for respectively feeding connection ends of said discharge resistor and wound capacitor therethrough, said connection ends being dip-soldered to said first and second appliance side connections of said ring core choke and being electrically conductively dip-soldered to said additional legs of said metallic angle plates.

15. Interference suppression filter according to claim 1, wherein said discharge resistor and wound capacitor have connection ends being directly electrically conductively dip-soldered to said first and second appliance side connections of said ring core choke.

16. Interference suppression filter according to claim 1, wherein said ring core choke has windings and an opening formed in said core, and including an insulating barrier being inserted in said ring core opening for spatially separating said windings from each other.

17. Interference suppression filter according to claim 16, including a synthetic centering platelet on which said insulating barrier is vertically and centrally disposed, the outer diameter of said platelet being substantially equal to the inner diameter of said metal cup.

18. Interference suppression filter according to claim 16, wherein at said bottom of said cup a centering pin is perpendicularly and centrally disposed thereon, and wherein said insulating barrier has a face facing said cup bottom having a conical centering depression being centrally formed therein and seated on said centering pin.

19. Interference suppression filter according to claim 16, wherein said bottom of said cup has a centering depression centrally formed therein, and said insulating barrier has a face facing said cup bottom having a centrally disposed centering pin disposed thereon, said centering pin being tapered toward said cup bottom and being in engagement with said centering depression.

20. Interference suppression filter according to claim 17, 18 or 19, wherein said wound capacitor has a central hole formed therein, and said insulating barrier has a face facing said wound capacitor having a centering point being centrally formed thereon and being immersible in said centering hole formed in said capacitor, in an assembled condition of the filter.

21. Interference suppression filter according to claim 7 further comprising a plugging device formed on a face of said plate for plugging said plate onto a face of said wound capacitor.

* * * * *